United States Patent Office 3,244,259
Patented Apr. 5, 1966

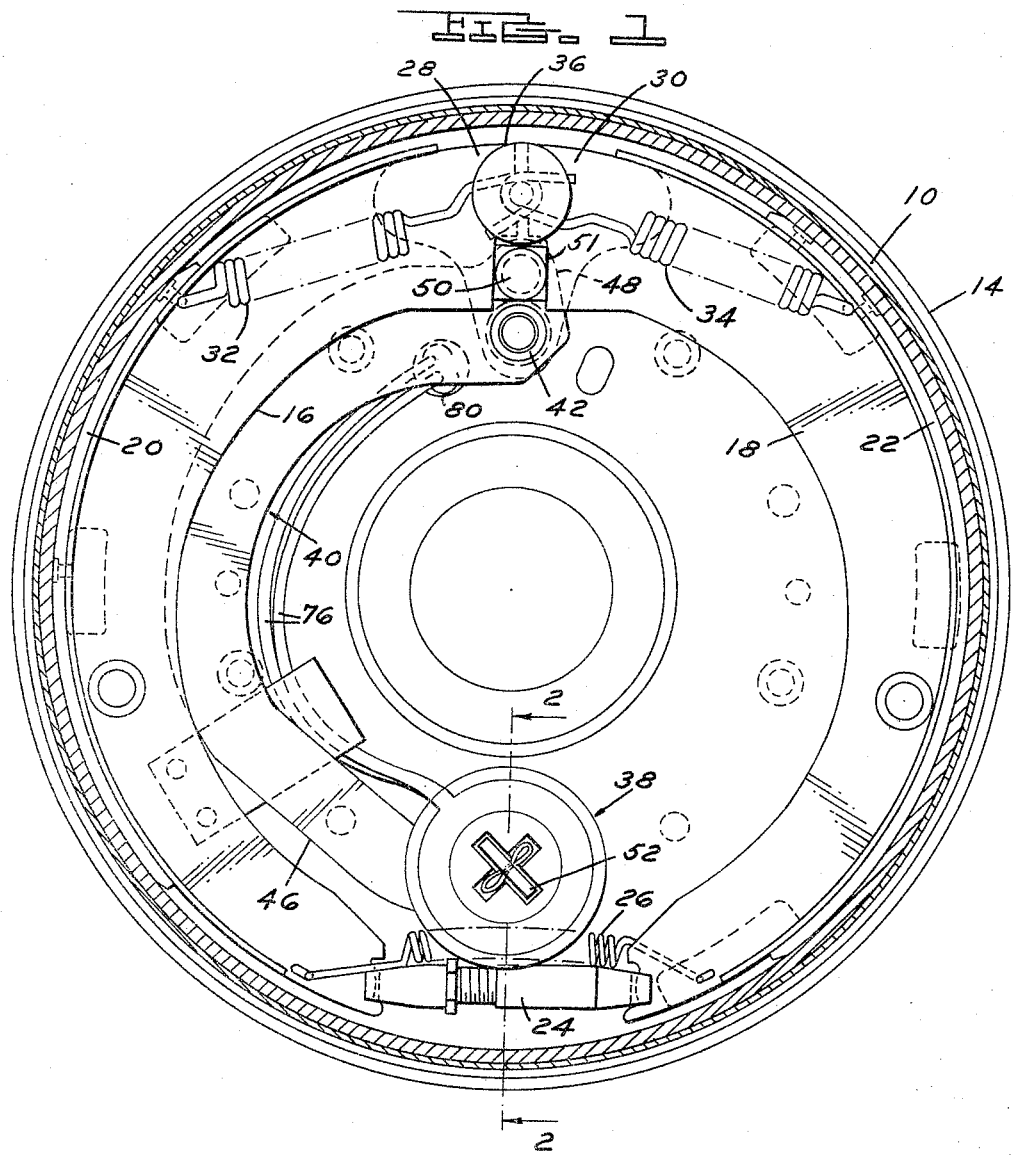

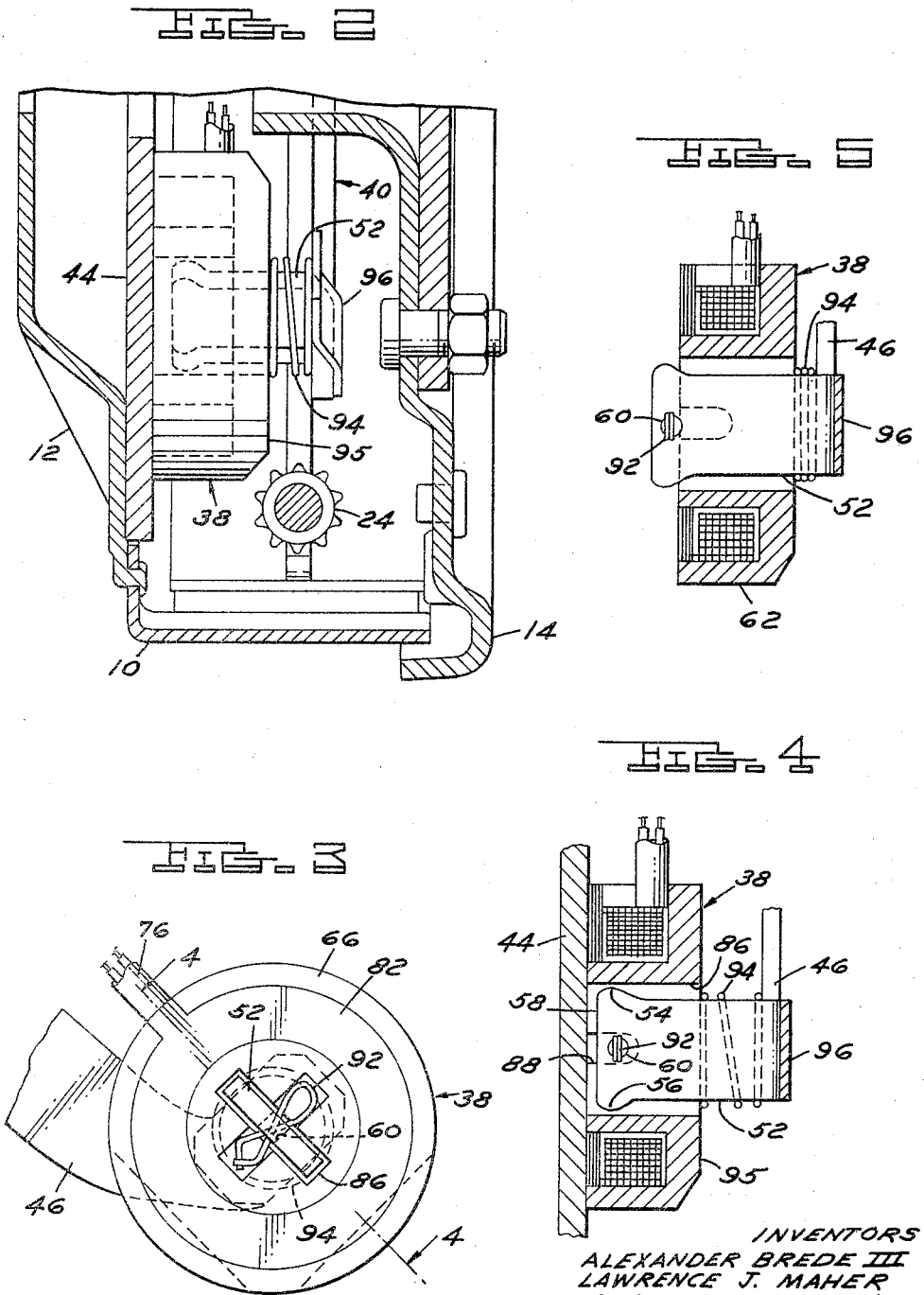

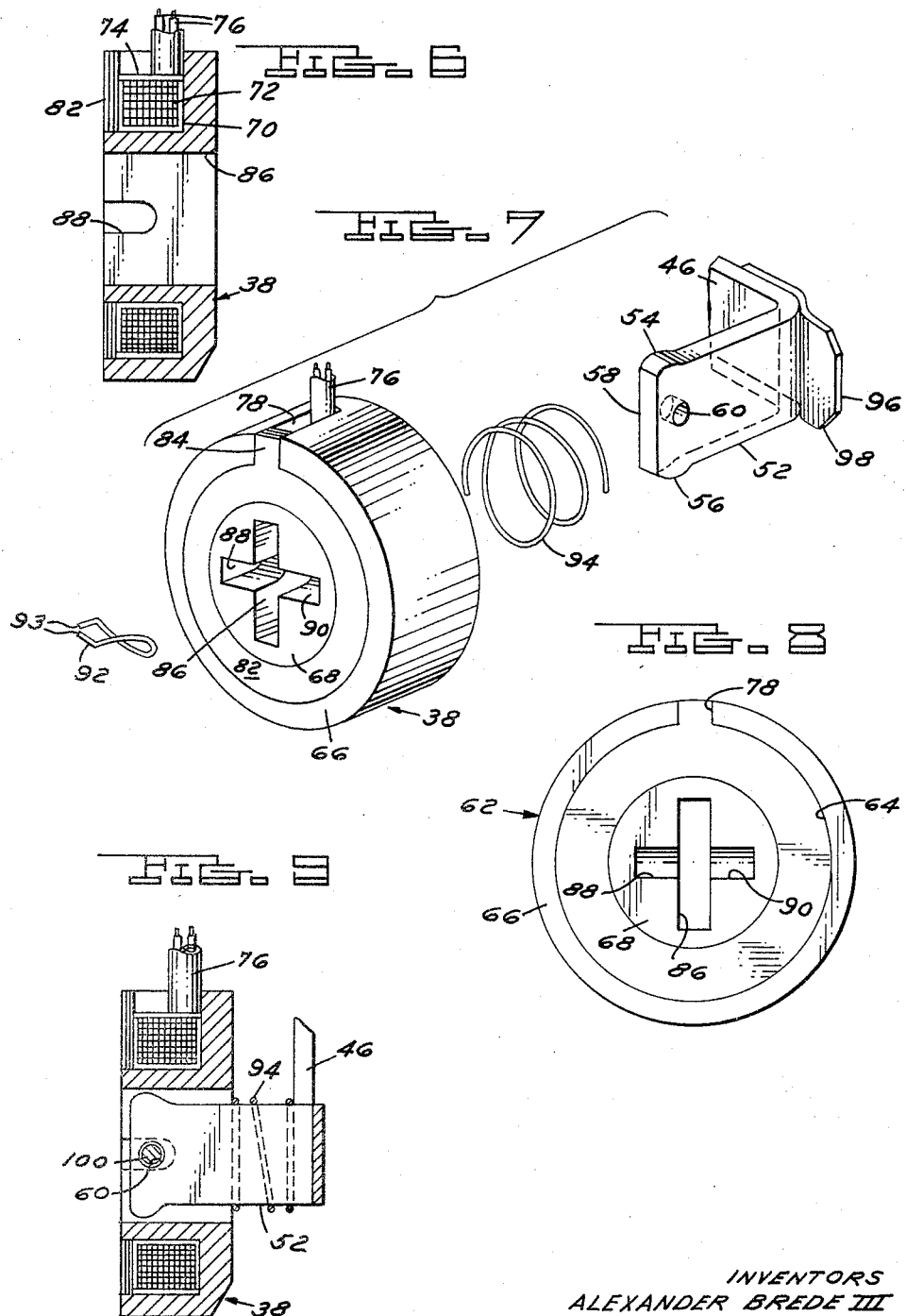

3,244,259
ELECTRIC BRAKE MECHANISM
Alexander Brede III, East Lansing, Mich., Lawrence J. Maher, Chicago, Ill., and Charles E. Schalla and Elvin E. Tuttle, Lansing, Mich., assignors to Motor Wheel Corporation, Lansing, Mich., a corporation of Michigan
Filed Jan. 31, 1964, Ser. No. 341,502
13 Claims. (Cl. 188—138)

This invention relates generally to brakes and more specifically to an improved electromagnet and lever assembly adapted to actuate a brake mechanism of the two-shoe single-anchor self-energizing articulated type such as those disclosed in United States Patents Nos. 2,273,065, 2,365,726 and 2,304,118.

Electric brakes of the character described in the aforementioned patents include an electromagnet supported on a movable lever arm and spring biased into light-pressure contact with a flat-face armature. The armature is made of suitable magnetic material and rotates with the wheel of a vehicle or other moving part to be braked. When the electromagnet is energized it is magnetically attracted to the relatively moving armature, and due to the friction between these two parts so attracted, a force is imposed on the magnet tending to move it in the direction of movement of the armature. This force is in turn transmitted by the lever arm to actuate the brake shoes into braking engagement with a brake drum.

As set forth in the aforementioned Patent No. 2,273,-065, it is desirable to mount the electromagnet non-rigidly on the lever arm from within the central portion of the electromagnet and at a plane closely adjacent that of the rubbing contact between armature and electromagnet in order to reduce the moments tending to overturn the electromagnet. This relationship prevents the establishment of un-equal pressures on the face of the electromagnet and hence greatly minimizes the production of localized high pressure and high temperature areas. It is also desirable to mount the electromagnet so that it has limited freedom of axial and universal pivotal movement with respect to the lever arm. Thus if the armature in rotating tends to oscillate slightly in the axial direction due to end play, or to wobble or otherwise run out of true, the electromagnet can move in accommodation therewith, thereby tending to continuously maintain the desired flat rubbing contact relationship between the electromagnet and armature faces.

An object of the present invention is to provide an improved electromagnet and lever arm assembly which fulfills the above criteria with novel structure which is simpler, less expensive and more reliable than that of the prior art.

Another object is to provide an improved electromagnet and lever arm assembly wherein the electromagnet structure is easy to assemble on the lever arm due to a novel quick-disconnect structure which also insures positive retention of the electromagnet on the lever arm and permits ready removal therefrom, thereby facilitating service and replacement of the electromagnet structure.

Other objects, features and advantages of the invention will be apparent from the following description and accompanying drawings in which:

FIG. 1 is an elevational view, partly in section, of an electric brake assembly showing an electromagnet and lever arm assembly of the invention in assembled relation with a pair of brake shoes.

FIG. 2 is a sectional view taken on line 2—2 of FIG. 1, but with the electromagnet and lever arm assembly shown in elevation.

FIG. 3 is a fragmentary elevational view of the electromagnet mounted on the end of the lever arm, looking at the friction face side of the electromagnet.

FIG. 4 is a sectional view taken on line 4—4 of FIG. 3.

FIG. 5 is a sectional view similar to that of FIG. 4 but illustrating the electromagnet displaced inwardly on the lever arm to permit removal of a spring clip which serves as a retaining pin in one embodiment of the quick-disconnect structure of the invention.

FIG. 6 is a sectional view similar to FIGS. 4 and 5 but illustrating the electromagnet removed from the lever arm.

FIG. 7 is an exploded fragmentary perspective view of the electromagnet and lever arm assembly of FIGS. 1–6.

FIG. 8 is an elevational view of the housing of the electromagnet structure.

FIG. 9 is a sectional view similar to that of FIG. 4 but illustrating a modified form of retaining pin.

Referring to FIGS. 1 and 2 of the drawings, a brake drum 10 is attached to a back 12 which is in turn attached to the rotating wheel of a vehicle (not shown). The non-rotatable supporting structure of the brake includes a backing plate 14 which is affixed to the vehicle axle in a conventional manner. A pair of brake shoes 16 and 18, carrying brake linings 20 and 22 respectively, is articulated at its lower ends by the usual adjusting screw 24 and tension spring 26. The oppositely disposed operating ends 28 and 30 of the shoes 16 and 18 are pulled by tension springs 32 and 34 into retracted position against an anchor pin 36 carried by plate 14.

The actuating means for controllably applying shoes 16 and 18 in braking engagement with drum 10 comprises an electromagnet structure 38, a lever 40 pivoted on a pin 42 carried by backing plate 14, and a disc-like flat-face armature plate 44 (FIG. 2) affixed to back 12 with its face perpendicular to the drum axis. Lever 40 swings about pin 42 and comprises a relatively long arm 46, suitably curved and offset to pass around the drum axis and to position the electromagnet 38 at a point 180° from pin 42, and a short arm 48 carrying a pin 50 and swivel block 51 against which the ends 28, 30 of the brake shoes closely abut when they are both retracted as shown in FIG. 1.

Assuming counterclockwise rotation of armature 44 and drum 10 as viewed in FIG. 1, electromagnet 38 when energized will be moved to the right, thereby moving pin 50 to the left so that it pushes against end 28 of shoe 16 to move the shoe outwardly into braking engagement with drum 10. This engagement in turn develops a self-energizing force on shoe 16 which is transmitted via screw 24 to shoe 18 to cause it to also move into braking relation with drum 10, as is well understood in the art. For clockwise rotation of armature 44 the action is reversed, electromagnet 38 moving to the left to cause pin 50 to engage end 30 of shoe 18.

The present invention is directed to improvements in the structure of electromagnet 38 and lever 40, the details of which are shown in FIGS. 3–9. As best seen in FIG. 7, the lower end of the long arm 46 of lever 40 is bent at right angles to form a short arm or tab 52 integral with arm 46 which extends towards armature 44. Tab 52 has a pair of oppositely disposed rounded protuberances 54 and 56 at either end of the straight terminal edge 58 of the tab. Tab 52 also has a hole 60 extending perpendicularly therethrough adjacent edge 58.

Electromagnet 38 is a sub-assembly consisting of an annular housing 62 (FIG. 8) made of suitable magnetic core material and having an annular recess 64 in the friction face thereof. Recess 64 divides the housing into annular outer and inner poles 66 and 68. Recess 64 receives a magnet coil assembly (FIG. 6) comprising a nylon bobbin 70 in the form of a donut-shaped channel, windings 72 wound within bobbin 70, and an insulator ring 74 which encircles windings 72. A pair of lead wires 76 is connected to the ends of windings 72 and extends therefrom through a slot 78 in pole 66 (FIGS. 7 and 8). As shown in FIG. 1, wires 76 run back along lever 40 to a grommet 80 where they are led through backing plate 14. The coil assembly 70, 72, 74 bottoms in recess 64 and is bonded to housing 62 by a suitable adhesive. The coil assembly is covered by a washer 82 which is made of a suitably non-magnetic insulating material and has a tab 84 which is received in slot 78 to key the washer to the housing. In addition to being keyed in slot 78, the insulating washer is preferably bonded to bobbin 70.

Housing 62 has a rectangular through-opening 86 (FIG. 8) coincident with the axis of the housing which is dimensioned to receive tab 52 with a loose clearance fit therein (FIGS. 3 and 4) so that housing 62 has a limited amount of horizontal and vertical play with respect to tab 52. A pair of rectangular recesses 88 and 90 (FIGS. 7 and 8) is formed in the face of pole 68 at right angles to opening 86 and extends axially inwardly along opening 86 to a predetermined depth in the housing for registry with hole 60 of tab 52. Recesses 88, 90 receive the oppositely projecting ends of a retaining pin, preferably in the form of a spring clip 92, which is inserted through tab hole 60 (FIG. 3). Clip 92 consists of a piece of spring wire bent into a pair of loops in the form of a figure eight (FIGS. 3 and 8) so that its ends 93 may be squeezed together to compress the clip for insertion thereof bent-end first into hole 60.

Housing 62 is biased away from lever arm 46 by a coil compression spring 94 (FIG. 8) which encircles tab 52 and butts at one end against the rear face 95 of housing 62 (FIGS. 2 and 4) and at the other end against arm 46 on one side of tab 56 and against a spring support 96 on the other side of tab 52. Support 96 is an S-shaped stamped metal part which is spot welded to arm 46 to provide a spring supporting surface 98 (FIG. 7) coplanar with the spring supporting side of arm 46.

To assemble electromagnet 38 on lever 40, spring 94 is first slipped over tab 52 and then tab 52 is inserted through opening 86, thereby compressing spring 94, until hole 60 is disposed outwardly of the friction face of housing 62, as shown in FIG. 5. With hole 60 thus exposed, clip 92 is squeezed together, inserted into hole 60 and then released when halfway therethrough. Assembly pressure on lever 40 and electromagnet 38 is then released, allowing spring 94 to push electromagnet 38 away from arm 46 until further movement is stopped by clip 92 bottoming in recesses 88, 90. Due to the clearances between tab 52 and slot 86, as augmented by protuberances 54 and 56, electromagnet 38 has limited freedom of universal pivotal movement relative to tab 52, which movement is resiliently resisted by springs 92 and 94 which tend to center electromagnet 38 on tab 52.

When the electromagnet-lever sub-assembly is installed in final assembled relation in the brake (FIGS. 1 and 2), spring 94 biases the electromagnet into light pressure contact with armature 44. Normally in this condition the parts are positioned as shown in FIG. 4 wherein the edge 58 of tab 52 is spaced sufficiently from armature 44 to permit electromagnet 38 to rock about the axis of clip 92 without exposing the ends of tab 52. Clip 92 is likewise spaced sufficiently from the bottom of recesses 88, 90 to accommodate normal wear on the face of electromagnet 38.

It will be noted from FIG. 1 that tab 52 is preferably disposed with its wide sides at an angle of about 45° to a line intersecting tab 52 and the axis of armature 44. Hence the friction forces exerted by armature 44 on electromagnet 38 will tend to cause the electromagnet to bear primarily against protuberances 54 and 56, depending upon the direction of rotation of armature 44. Tab 52 thus provides a modified ball and socket joint between lever arm 46, electromagnet 38 being able to pivot to a greater extent about the axis of clip 92 than about the axis of tab 52. Since protuberances 54, 56 are located adjacent the end of tab 52, they provide non-rigid support of the electromagnet at a plane closely adjacent the flat face thereof, thereby reducing moments tending to overturn the electromagnet when in energized flat rubbing contact relation with the rotating armature plate 44.

It is also to be noted that the complementary rectangular shapes of tab 52 and opening 86 prevents all but limited rotation of electromagnet 38 relative to arm 46, thereby eliminating the need for a separate retaining member to serve this function. By simply bending the outer end of lever arm 46 to form tab 52, a properly shaped, relatively heavy gauge supporting arm is provided which is joined integrally to lever 40, thereby insuring a very strong and reliable support for electromagnet 38.

In addition to facilitate initial assembly, the pin and slot connection between electromagnet 38 and lever arm 46 facilitates removal and replacement of the electromagnet in the field, thereby reducing service costs. To insert or remove clip 92 it is only necessary to push electromagnet 38 towards arm 46, against the pressure of spring 94, until the magnet friction face is disposed inwardly of hole 60 in tab 52.

It is to be understood that other forms of retaining pins may be used in place of spring clip 92. For example, as shown in FIG. 9, a cylindrical pin 100 having a loose fit in hole 60 may be used in place of clip 92, although the latter is preferred since it is self-retaining in tab 52 and provides a resilient engagement with housing 62 which tends to reduce noise.

From the foregoing description it will now be apparent that the present invention provides a simple, reliable and low cost electromagnet and actuating arm subassembly for an electric brake.

We claim:

1. In an electric brake mechanism the combination comprising an armature adapted to be rotated about an axis, a lever having an arm extending therefrom generally parallel to said axis toward said armature, an electromagnet having a friction face and an internal wall defining an opening in said electromagnet extending transverse to said face, said arm extending into said opening and supporting said electromagnet thereon, said arm and said wall each having a non-circular configuration in a plane transverse to said arm providing a predetermined angular clearance in said plane between said wall and arm to permit limited rotation of said electromagnet on said arm between end limits as defined by non-rotatable engagement of said arm and wall, and means adapted to maintain said electromagnet with its friction face in rubbing contact with said armature.

2. The combination set forth in claim 1 wherein said arm and said wall are both generally rectangular in configuration in said plane to provide said non-circular configuration.

3. In an electric brake mechanism the combination comprising an armature adapted to be rotated about an axis, a lever having an arm extending towards said armature, an electromagnet having a friction face and an opening extending transverse to said face for receiving said arm with a clearance fit, said arm and said opening having cooperative shapes adapted to limit relative rotation between the electromagnet and the arm to the clearance of the fit therebetween, and means adapted to maintain said electromagnet with its friction face in rubbing contact with said armature, said arm having a portion projecting outwardly therefrom radially of said electromagnet and generally in a direction of rotation of the armature to form a modified ball and socket connection between said arm and electromagnet.

4. The combination set forth in claim 3 wherein said arm extends into said electromagnet and has a terminal end disposed inwardly of the plane of said face of said electromagnet, said projecting portion being disposed at the terminal end of said arm.

5. The combination set forth in claim 3 wherein said arm is arranged such that said projecting portion is in a plane disposed at about a forty-five degree angle to a line intersecting said armature axis and said arm.

6. In an electric brake the combination comprising a brake actuating lever having an arm extending transversely therefrom and terminating at a point spaced from said lever, an electromagnet movably supported on said arm adjacent the terminal end thereof and a spring acting between said lever and said electromagnet for biasing said electromagnet outwardly on said arm towards said terminal end thereof, said arm and electromagnet having means forming a disconnectable pin and slot connection normally disposed within said electromagnet and exposable outside said electromagent for removal of said pin by movement of said electromagnet towards said lever against pressure of said spring.

7. The combination set forth in claim 6 wherein said electromagnet has an opening therethrough adapted to receive said arm with a clearance fit, said arm and said opening having cooperative shapes adapted to prevent relative rotation between the electromagnet and the arm beyond the limits permitted by said clearance fit therebetween.

8. The combination set forth in claim 7 wherein said arm and said opening in said electromagnet are polygonal in shape and said arm has rounded portions projecting outwardly from opposite sides thereof to form a modified ball and socket connection between said arm and electromagnet.

9. The combination set forth in claim 6 wherein said lever and arm are integral with one another and formed from flat rectangular metal stock.

10. The combination set forth in claim 6 wherein said means forming a pin and slot connection comprises a hole in said arm, a pin inserted through said arm hole and a slot in said electromagnet adapted to receive the ends of said pin projecting from either side of said arm, said slot opening to the face of said electromagnet remote from said lever.

11. An electromagnet and brake actuating arm assembly comprising a lever for actuating a brake, an arm on said lever projecting transversely therefrom, an electromagnet movably supported on said arm and including core structure having an opening receiving said arm with a clearance fit, said core structure having a recess therein intersecting said opening, said arm having a hole therethrough in registry with said recess, retaining means extending through said arm hole and received in said recess and means for biasing said electromagnet away from said lever to thereby maintain said retaining means disposed within said recess.

12. The combination set forth in claim 11 wherein said retaining means comprises a spring clip made of a short length of spring wire bent to form a pair of loops in the form of a figure eight and having its ends arranged adjacent one another at the outer end of one of said loops whereby said one loop may be squeezed to permit insertion of said spring clip in said hole.

13. Electromagnet structure for an electric brake comprising a generally disc-shaped housing made of magnetic material and having a flat side disposed in a plane perpendicular to the axis of said housing, an annular recess formed in said flat side dividing said housing into an outer annular pole portion and a central pole portion, said outer pole portion having a radial slot extending between said recess and the outer periphery thereof, an annular channel-shaped bobbin disposed in said annular recess with the open side thereof facing said outer pole and carrying electromagnetic windings therein, an insulating ring encircling said windings and bobbin radially inwardly of said outer pole, lead wires extending through said slot connected to said windings, an insulating washer disposed in said annular recess against said bobbin, said insulating washer having a radial projection received in said slot, said central pole portion having an opening extending therethrough co-incident with the axis of said housing adapted to receive a support arm, said housing having a pair of recesses extending axially from said flat side and intersecting said throughopening for receiving a retaining pin carried on the support arm.

References Cited by the Examiner

UNITED STATES PATENTS 3,134,463    5/1964    Birge _____ 188—138

FOREIGN PATENTS 1,026,519    2/1953    France.

MILTON BUCHLER, *Primary Examiner.*

DUANE A. REGER, ARTHUR L. LA POINT,
*Examiners.*